US012589909B2

(12) United States Patent
Barber

(10) Patent No.: US 12,589,909 B2
(45) Date of Patent: Mar. 31, 2026

(54) STACKING TRAY SYSTEM AND STACKABLE COOKWARE SET

(71) Applicant: BRADSHAW HOME, Rancho Cucamonga, CA (US)

(72) Inventor: Tom Barber, Redondo Beach, CA (US)

(73) Assignee: BRADSHAW HOME, Rancho Cucamonga, CA (US)

( * ) Notice: Subject to any disclaimer, the term of this patent is extended or adjusted under 35 U.S.C. 154(b) by 295 days.

(21) Appl. No.: 17/188,697

(22) Filed: Mar. 1, 2021

(65) Prior Publication Data

US 2021/0269194 A1      Sep. 2, 2021

Related U.S. Application Data

(60) Provisional application No. 62/983,164, filed on Feb. 28, 2020.

(51) Int. Cl.
*B65D 21/02* (2006.01)
*A47J 37/10* (2006.01)
*A47J 47/16* (2006.01)

(52) U.S. Cl.
CPC ........ *B65D 21/0224* (2013.01); *A47J 37/108* (2013.01); *A47J 47/16* (2013.01)

(58) Field of Classification Search
CPC .......... B65D 71/70; B65D 2501/24611; B65D 21/0216; B65D 2571/00895; B65D 5/005; B65D 5/0065; B65D 21/0224; A47J 6/34; A47J 36/025; A47J 47/16; A47J 27/12; A47J 27/122; A47J 27/13; Y10S 220/919
USPC ................. 220/573.1, 573.4, 23.83; 206/514
See application file for complete search history.

(56) References Cited

U.S. PATENT DOCUMENTS

| | | | | | |
|---|---|---|---|---|---|
| 1,003,112 | A | * | 9/1911 | Johnson | A47J 27/10 |
| | | | | | 220/573.4 |
| 1,683,205 | A | * | 9/1928 | Packard | A47G 23/03 |
| | | | | | 215/394 |
| 2,827,217 | A | * | 3/1958 | Clement | A47G 7/085 |
| | | | | | 47/65.5 |
| 3,379,340 | A | * | 4/1968 | Silvio | B65D 21/0209 |
| | | | | | D7/553.6 |
| 4,106,486 | A | * | 8/1978 | Lee | A47J 27/04 |
| | | | | | 126/369 |

(Continued)

FOREIGN PATENT DOCUMENTS

WO       WO-2012139158 A1 * 10/2012   ............... A01G 9/02

OTHER PUBLICATIONS

Amazon Evelots, Evelots 28 Piece Set—Pan/Pot/Dish Scratch Protector-Felt-Cookware/Glass Divider—2 Sizes, 2017 (Year: 2017).*

(Continued)

*Primary Examiner* — Ernesto A Grano
*Assistant Examiner* — Symren K Sanghera
(74) *Attorney, Agent, or Firm* — Birch, Stewart, Kolasch & Birch, LLP

(57) ABSTRACT

A stacking system including a plurality of stacking trays, each stacking tray being configured to support a corresponding cookware is provided. Each stacking tray may include a bottom wall, a sidewall extending upward from the bottom wall, and a flange extending radially outward from an upper portion of the sidewall. A stackable cookware set having a plurality of stacking trays and a plurality of cookware is also provided.

13 Claims, 9 Drawing Sheets

(56)                References Cited

U.S. PATENT DOCUMENTS

| | | | | |
|---|---|---|---|---|
| 4,407,414 A * | 10/1983 | Rey | B65D 85/54 | |
| | | | 229/87.01 | |
| 4,508,768 A * | 4/1985 | Kornely | A47J 36/022 | |
| | | | 206/520 | |
| 4,978,019 A * | 12/1990 | Maroudas | A47G 19/30 | |
| | | | 220/4.26 | |
| 5,048,688 A * | 9/1991 | Hicks, Jr. | A47J 45/061 | |
| | | | 206/821 | |
| 5,931,333 A * | 8/1999 | Woodnorth | A47J 43/24 | |
| | | | 220/DIG. 27 | |
| 6,364,151 B1 * | 4/2002 | Gale | A47G 23/0216 | |
| | | | 220/737 | |
| 6,918,508 B2 * | 7/2005 | Hwang | B65D 21/064 | |
| | | | 220/817 | |
| 8,070,116 B1 * | 12/2011 | Malaspino | A47G 19/08 | |
| | | | 220/573.1 | |
| 8,347,903 B2 * | 1/2013 | de Raddo | A47J 43/24 | |
| | | | 220/756 | |
| 8,511,484 B1 * | 8/2013 | Greenberg | A47J 47/16 | |
| | | | 211/49.1 | |
| 8,770,431 B1 * | 7/2014 | Glaser | B65D 1/34 | |
| | | | 220/521 | |
| 8,807,368 B1 * | 8/2014 | Riedel | A47G 23/06 | |
| | | | 220/574 | |
| 8,967,408 B2 * | 3/2015 | Tyberghein | B65D 25/10 | |
| | | | 206/541 | |
| 10,822,785 B1 * | 11/2020 | Berry | E03F 5/0404 | |

| | | | | |
|---|---|---|---|---|
| 11,084,624 B1 * | 8/2021 | Allen | B65D 21/04 | |
| 2003/0183549 A1 * | 10/2003 | Verna | B65D 21/046 | |
| | | | 206/509 | |
| 2006/0070907 A1 * | 4/2006 | O'Shea | B65D 21/0223 | |
| | | | 206/514 | |
| 2006/0118450 A1 * | 6/2006 | Stahl | B65D 21/062 | |
| | | | 206/506 | |
| 2007/0199943 A1 * | 8/2007 | Waldman | A47J 45/10 | |
| | | | 220/573.3 | |
| 2008/0302693 A1 * | 12/2008 | Albert | A47J 47/16 | |
| | | | 206/485 | |
| 2012/0193260 A1 * | 8/2012 | Baltz | B65D 21/0212 | |
| | | | 206/503 | |
| 2013/0220916 A1 * | 8/2013 | Casalino | A47G 19/30 | |
| | | | 210/470 | |
| 2016/0095470 A1 * | 4/2016 | Jones | A23L 5/15 | |
| | | | 426/523 | |
| 2017/0247143 A1 * | 8/2017 | Gossens | A47J 45/06 | |
| 2019/0283952 A1 * | 9/2019 | Pawlick | B65D 81/3438 | |
| 2019/0365132 A1 * | 12/2019 | Farkas | A47J 36/20 | |
| 2021/0047817 A1 * | 2/2021 | Berry | E03C 1/264 | |

OTHER PUBLICATIONS

EBay, 7" Dia. CS Bavaria Stamp, Porcelain 10-Sided Plate With Slotted Rim. 0.875" Tall, https://www.ebay.com/itm/225487289519, 1930-1939, eBay (Year: 1939).*

EBay Bavaria (Year: 1939).*

* cited by examiner

200

210

220

230

240

250

260

STACKING TRAY SYSTEM AND STACKABLE COOKWARE SET

CROSS-REFERENCE TO RELATED APPLICATIONS

This application claims the benefit of U.S. Provisional Application No. 62/983,164, filed Feb. 28, 2020, which is herein incorporated by reference in its entirety.

BACKGROUND OF THE DISCLOSURE

Field of the Disclosure

The present disclosure is directed generally to stackable cookware sets. More particularly, the present disclosure is directed to a stacking tray system having one or more stacking trays configured to be inserted between adjacent cookware and stackable cookware sets having the same.

Description of Related Art

In general, most kitchens, whether in homes, restaurants, and other facilities, will have cookware for food preparation. The cookware will often come in different sizes and shapes depending on their particular uses, such as, sauté pans, sauce pots, Dutch ovens or general use skillets. Typically, the cookware will be stored in a cupboard or other storage location with limited space. Consequently, they are often stacked upon one another in a haphazard manner. Lids for the various cookware are often stored in the same space.

One problem with stacking the cookware in this manner is that one portion of an upper cookware can come into contact with or rest upon an inner surface of a lower cookware. As such, the inner surface may be damaged, thereby rendering the cookware unsuitable for its intended use. For example, if the cookware has a non-stick coating, the non-stick coating could become damaged.

Another problem with stacking the cookware in this manner is that it makes it difficult to organize the cookware or makes it more difficult to remove or store a particular cookware.

BRIEF SUMMARY OF THE DISCLOSURE

According to principles of this disclosure a plurality of stacking trays is provided to help organize the storage space for the cookware. The stacking trays may also prevent an upper cookware from contacting or directly resting on an inner surface of a lower cookware.

According to one aspect of the present disclosure, a stacking system is provided that may include a plurality of stacking trays, each stacking tray configured to support a corresponding cookware. Each stacking tray may include a bottom wall, a sidewall extending upward from the bottom wall, and a flange extending radially outward from an upper portion of the sidewall.

Each stacking tray may include a plurality of slots extending radially away from a center of the stacking tray.

Each slot may extend along at least a portion of the sidewall into the flange. Each slot may not extend into the bottom wall.

Each stacking tray may include one or more ribs extending outward from the sidewall.

A length of each of the one or more ribs may be greater than or less than a length of adjacent slots in the sidewall.

Each of the one or more ribs may be curved.

The plurality of stacking trays may include a first stacking tray and a second stacking tray, and the one or more ribs of the first stacking tray may be receivable in corresponding slots of the second stacking tray.

The plurality of stacking trays may include at least three stacking trays. An outer diameter of each flange of each stacking tray may increase from an uppermost tray to a lower most tray.

According to another aspect of the present disclosure, a stackable cookware set is provided that includes a plurality of stacking trays and a plurality of cookware. A total number of stacking trays is one less than a total number of the cookware such that a corresponding stacking tray is locatable between adjacent pairs of cookware. Each stacking tray may include a bottom wall, a sidewall extending upward from the bottom wall, and a flange extending radially outward from an upper portion of the sidewall.

The plurality of cookware may include at least three selected from a small sauté pan, a small sauce pot, a medium sauce pot, a Dutch oven, a medium sauté pan, a deep sauté pan, and a large sauté pan.

Each cookware may include at least one handle.

Further scope of applicability of the present application will become more apparent from the detailed description given hereinafter. However, it should be understood that the detailed description and specific examples, while indicating embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The present disclosure will become more fully understood from the detailed description given hereinbelow and the accompanying drawings which are given by way of illustration only, and thus are not limitative of the present disclosure and wherein.

DETAILED DESCRIPTION OF THE DISCLOSURE

Figure 1:
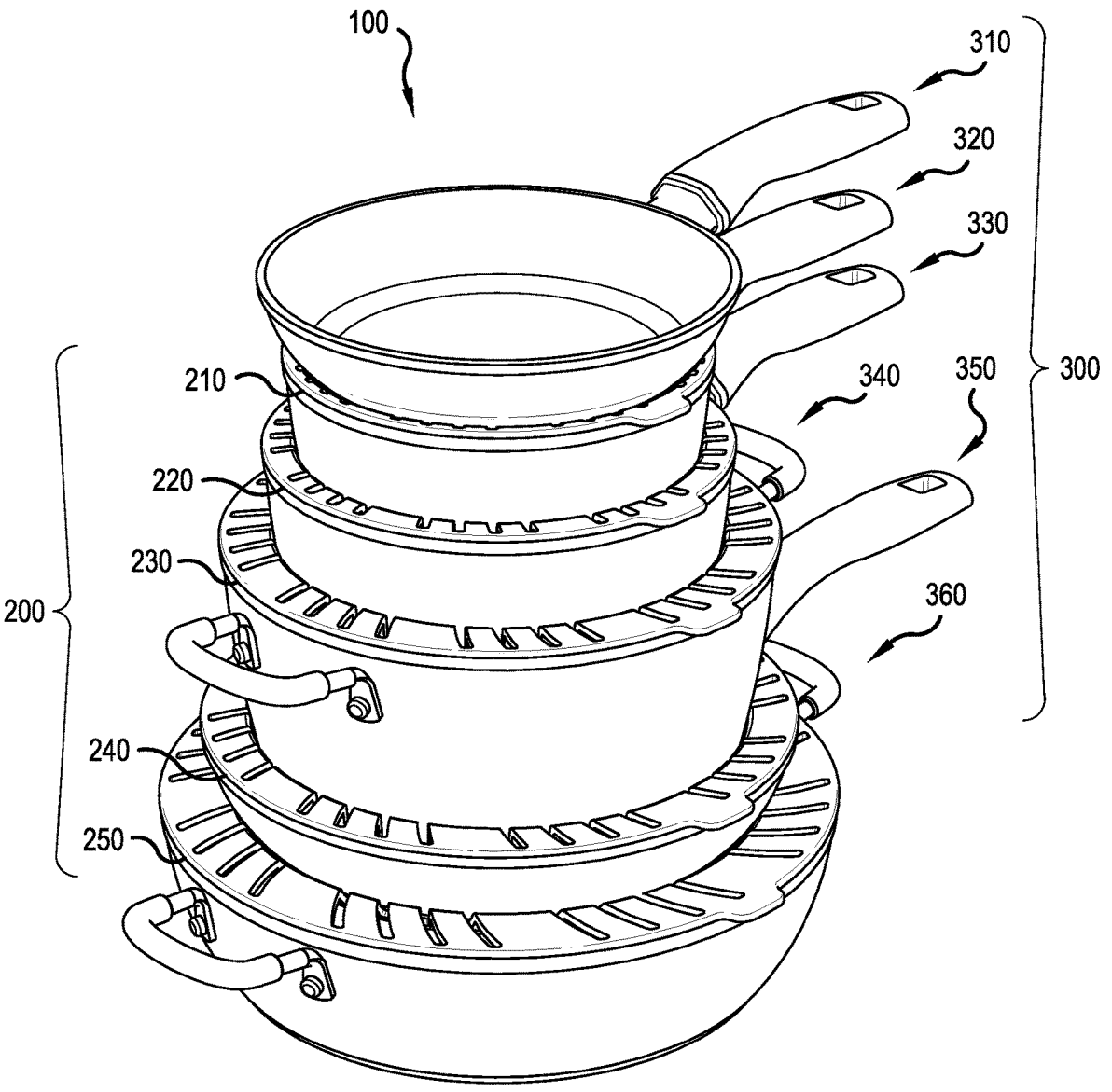
FIG. 1 is a perspective view of a stackable cookware system according to an embodiment of the present disclosure.
Figure 2:
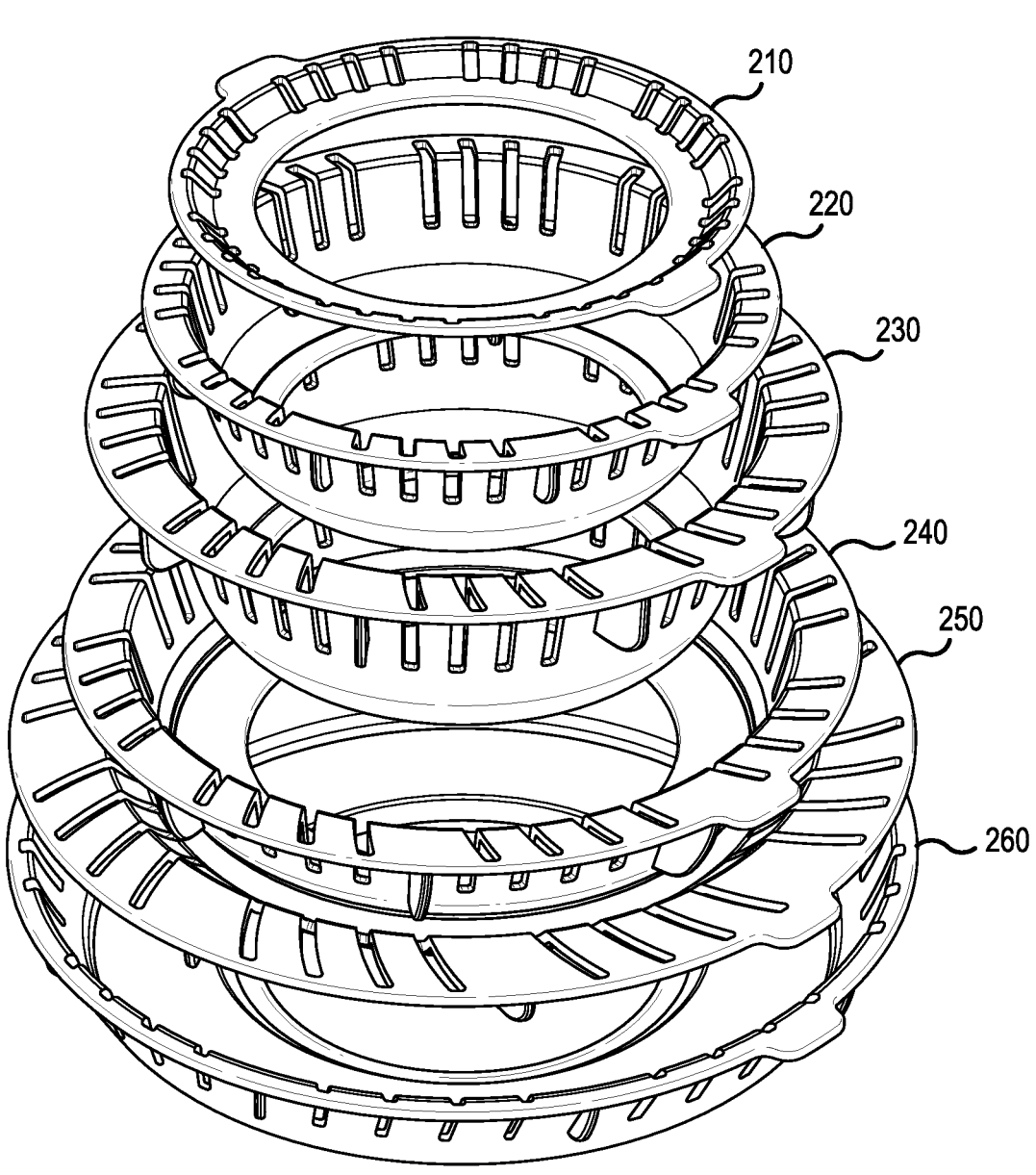
FIG. 2 is a perspective view of a plurality of stacking trays according to an embodiment of the present disclosure.

Referring now in detail to the drawings for the purposes of illustrating exemplary embodiments of the present disclosure, a stackable cookware system 100 shown in FIGS. 1 and 2 include a plurality of stacking trays 200 and a plurality of stackable cookware 300. The plurality of stacking trays 200 may include one or more appropriately sized stacking trays 210, 220, 230, 240, 250 and 260. Not all stacking trays are necessarily provided and/or used at the same time as the number of stackable cookware may also be varied.

By way of example, as shown in FIG. 1, the stackable cookware system 100 may include a small sauté pan 310, a small sauce pot 320, a medium sauce pot 330, a Dutch oven 340, a medium sauté pan 350, and a deep sauté pan 360. As such, the first stacking tray 210 supports the small sauté pan 310 and rests upon a rim of the small sauce pot 320, the second stacking tray 220 supports the small sauce pot 320 and rests upon a rim of the medium sauce pot 330, the third stacking tray 230 supports the medium sauce pot 330 and rests upon a rim of the Dutch over 340, the fourth stacking tray 240 supports the Dutch oven 340 and rests upon a rim of the large sauté pan 350, and the fifth stacking tray 250 supports the large sauté pan 350 and rests upon a rim of the deep sauté pan 360. It is understood that the numbers and sizes of the stacking trays and cookware can be varied depending on the desired combinations in the stackable cookware system.

By providing a stacking tray between adjacent pairs of cookware when stored, it is possible to prevent the cookware from directly contacting each other. As a result, damage to the cookware can be avoided during storage.

Each of the stackable cookware may have one or two handles that are connected to the body of the cookware with conventional fasteners or by welding. The handles may be provided with a silicone grip. The bodies of the cookware may include a non-stick coating to improve the life of the cookware. In addition, while different types of cookware are discussed above, the relative sizes and uses of the cookware can vary.

Figure 3:
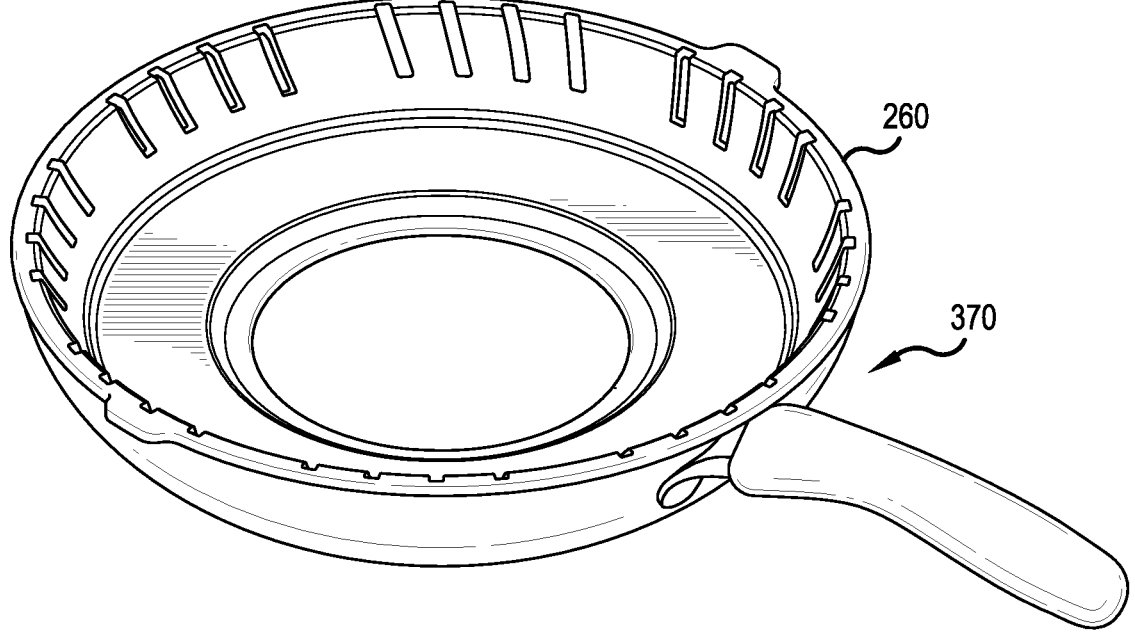
FIG. 3 is a perspective view of a cookware and stacking tray according to an embodiment of the present disclosure.

In addition to the first to fifth stacking trays 210 to 250 discussed above, as shown in FIG. 3, the sixth stacking tray 260 may be used with a large sauté pan 360. In some stackable cookware systems, the large sauté pan 360 may be provided in addition to the other stackable cookware or in place of another stackable cookware. For example, the sixth stacking tray 260 may be used to support the large sauté pan 350 or medium sauce pot 330 while resting on a rim of the large sauté pan 360. Alternatively, the sixth stacking tray 260 and large sauté pan 360 may be provided as a stand-alone set.

Figure 4A:
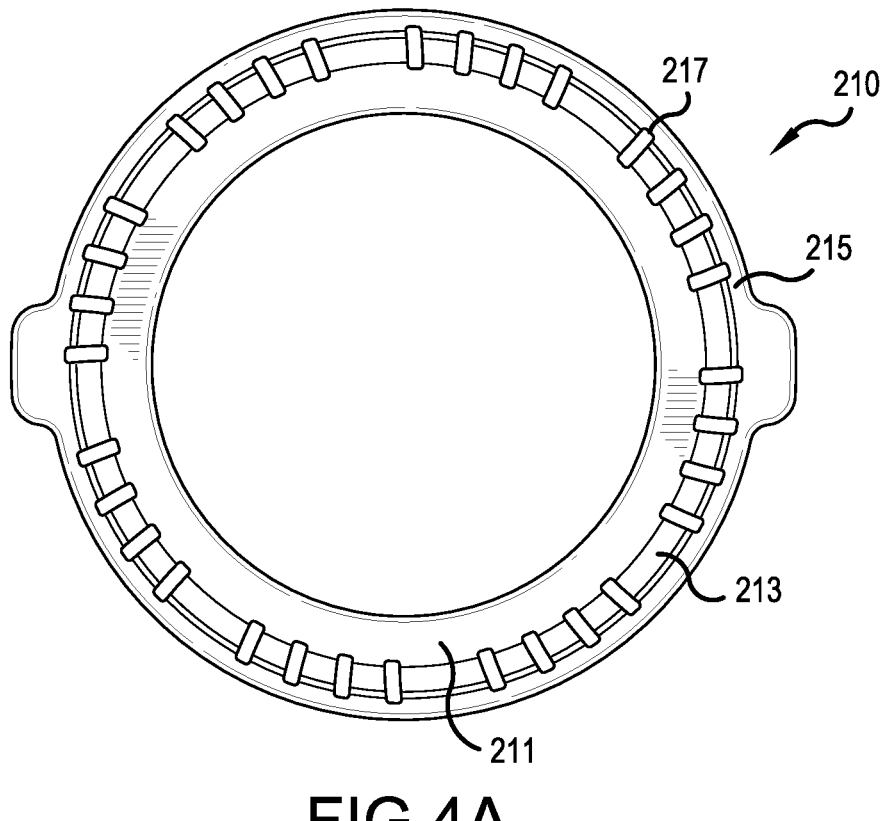
FIGS. 4A and 4B show a top and side view of a first stacking tray according an embodiment of the present disclosure.
Figure 4B:
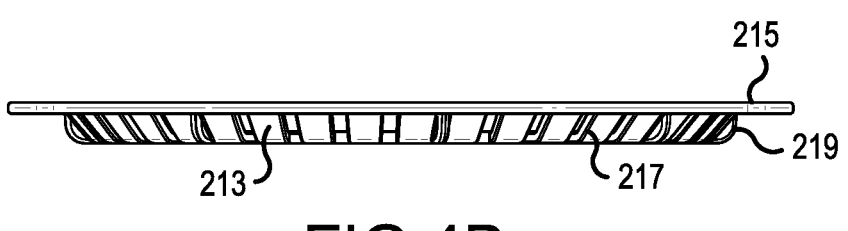

While each of the first to sixth stacking trays 210 to 260 may have different sizes or shapes depending on which cookware they support or rest upon, they each will typically have a bottom wall, a sidewall, and a flange. For example, as shown in FIGS. 4A and 4B, the first stacking tray 210 has a bottom wall 211, a sidewall 213 extending upward from the bottom wall 211, and a rim or flange 215 extending outward from an upper portion of the sidewall 213. The flange 215 may include a pair of spaced handles. In addition, an upper surface of the bottom wall may include indica for what cookware the first stacking tray 210 can support while a lower surface of the bottom wall may include indica for what cookware the first stacking tray 210 can rest upon.

The first stacking tray 210 may include a plurality of slots 217. As shown, the slots 217 may extend in a radial direction from a center of the first stacking tray 210. In this arrangement, the slots 217 are show as being substantially linear; however, the slots may also be curved. The slots 217 are shown extending from within the bottom wall 211, through the sidewall 213, and into the flange 215. The plurality of slots 217 reduce the amount of material necessary for the stacking tray. In addition, the slots 217 may allow for air flow between adjacent cookware to provide additional drying of the cookware while stacked.

In addition, the first stacking tray 210 may include one or more ribs 219 extending along an outer surface of the sidewall 213. The ribs 219 may rest on top of underlying cookware and/or be used to center the first stacking tray 210 on top of the underlying cookware. Depending on the size of the ribs 219, the ribs 219 may cooperate with slots of a lower stacking tray or rest on a surface of the lower stacking tray to maintain an orderly stack. For example, if the small sauté pan 310 is removed from the stack to be used, the first stacking tray 210 may rest on the second stacking tray 220 and the ribs 219 may engage slots 229 of the second stacking tray 220. In addition, as seen in the repeating pattern of the slots 217, the ribs 219 may be located between groups of four slots 217.

Figure 5A:
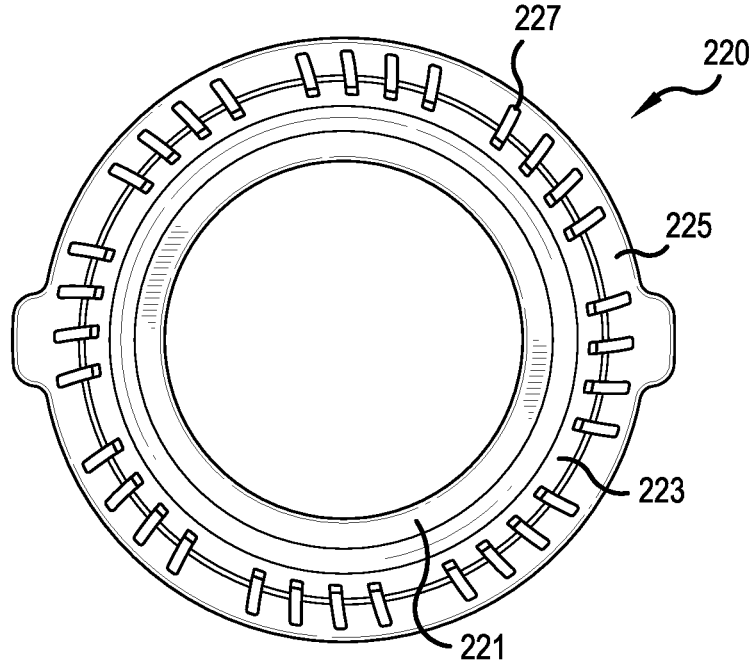
FIGS. 5A and 5B show a top and side view of a second stacking tray according an embodiment of the present disclosure.
Figure 5B:
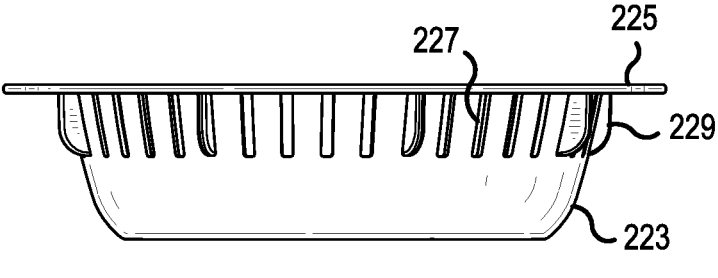

The second stacking tray 220 may have a similar configuration to the first stacking tray 210 as it also includes a bottom wall 221, a sidewall 223, and a rim or flange 225, as shown in FIGS. 5A and 5B. Generally, the sidewall 223 and the flange 225 are larger than those of the first stacking tray 210. The second stacking tray 220 may also include a plurality of slots 227 and one or more ribs 229 similar to the first stacking tray 210. In this arrangement, the slots 227 may not extend into the bottom wall 221 and may also be slightly curved as they extend in the radial direction. In this embodiment, the one or more ribs 229 may curve as they extend away from the sidewall 223. In addition, the length of the ribs 229 may be substantially equal to the length of the slots 227 in the sidewall 223.

Figure 6A:
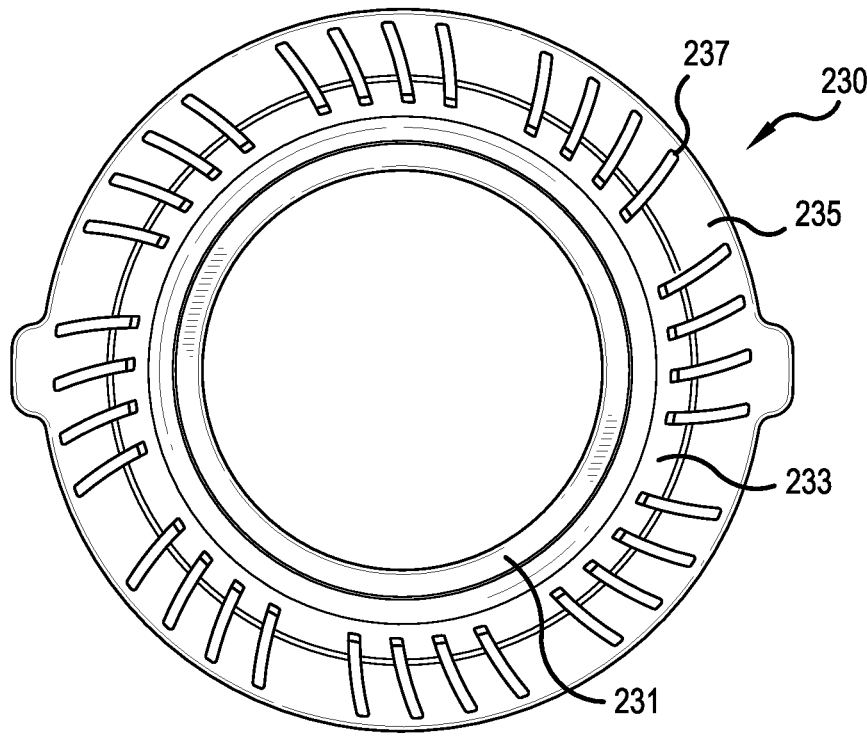
FIGS. 6A and 6B show a top and side view of a third stacking tray according an embodiment of the present disclosure.
Figure 6B:
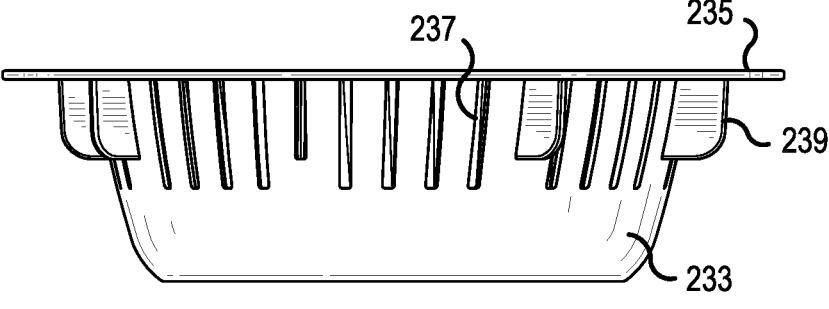

The third stacking tray 230 may have a similar configuration to the second stacking tray 220 as it includes a bottom wall 231, a sidewall 233, and a rim or flange 235, as shown in FIGS. 6A and 6B. Generally, the sidewall 233 and the flange 235 are larger than those of the second stacking tray 220. The third stacking tray 230 may also include a plurality of slots 237 and one or more ribs 239 similar to the second stacking tray 220. In this arrangement, the slots 237 may not extend into the bottom wall 231 and may also be slightly curved as they extend in the radial direction. The one or more ribs 239 may curve as they extend away from the sidewall 233. In addition, the length of the ribs 239 may be less than the length of the slots 237 in the sidewall 233.

Figure 7A:
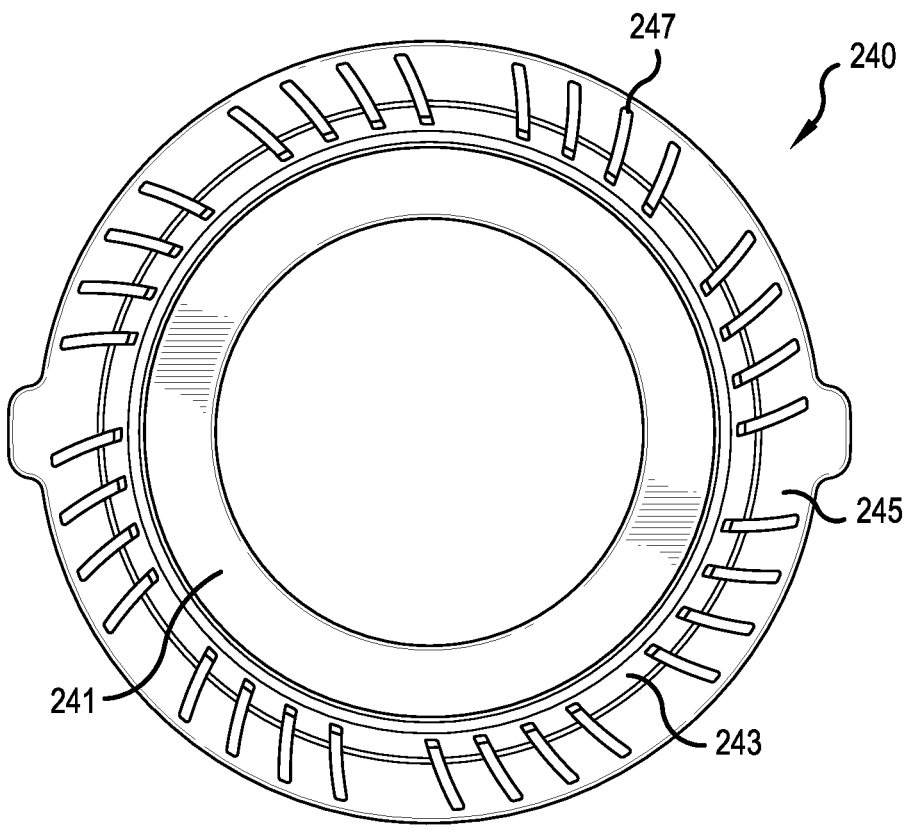
FIGS. 7A and 7B show a top and side view of a fourth stacking tray according an embodiment of the present disclosure.
Figure 7B:
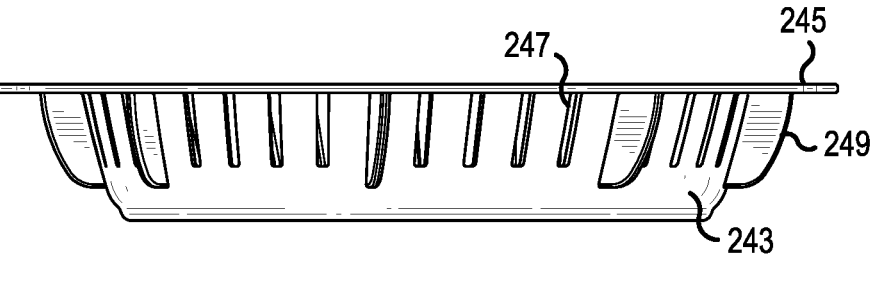

The fourth stacking tray 240 may have a similar configuration to the third stacking tray 230 as it includes a bottom wall 241, a sidewall 243, and a rim or flange 245, as shown in FIGS. 7A and 7B. Generally, the sidewall 243 may have a smaller height than that of the third stacking tray 230. The fourth stacking tray 240 may also include a plurality of slots 247 and one or more ribs 249 similar to the third stacking tray 230. In this arrangement, the slots 247 may not extend into the bottom wall 241 and may also be slightly curved as they extend in the radial direction. The one or more ribs 249 may curve as they extend away from the sidewall 243. In addition, the length of the ribs 249 may be greater than the length of the slots 247 in the sidewall 243.

Figure 8A:
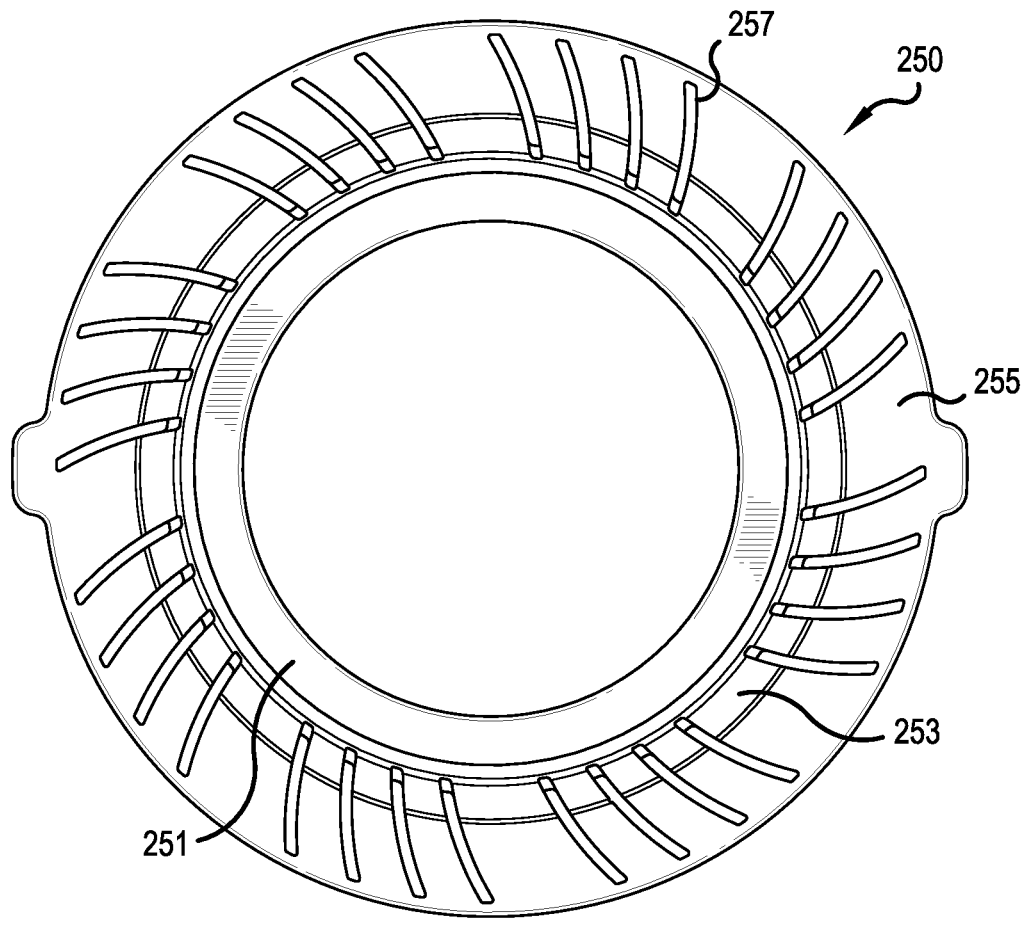
FIGS. 8A and 8B show a top and side view of a fifth stacking tray according an embodiment of the present disclosure.
Figure 8B:
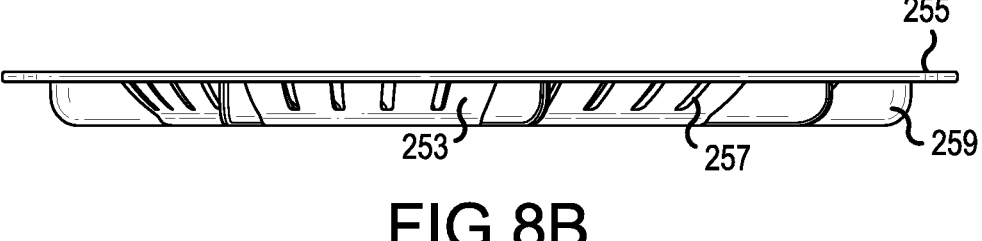

The fifth stacking tray 250 may have a similar configuration to the fourth stacking tray 250 as it also includes a bottom wall 251, a sidewall 253, and a rim or flange 255, as shown in FIGS. 8A and 8B. Generally, the sidewall 253 may have a smaller height than that of the fourth stacking tray 240 while the flange 255 may be larger than that of the fourth stacking tray 240. The fifth stacking tray 250 may also include a plurality of slots 257 and one or more ribs 259 similar to the fourth stacking tray 240. In this arrangement, the slots 257 may not extend into the bottom wall 251 and may also be slightly curved as they extend in the radial direction. The one or more ribs 259 may curve as they extend away from the sidewall 253. In addition, the ribs 259 may extend from the flange 255 to the bottom wall 251.

Figures 9A, 9B:
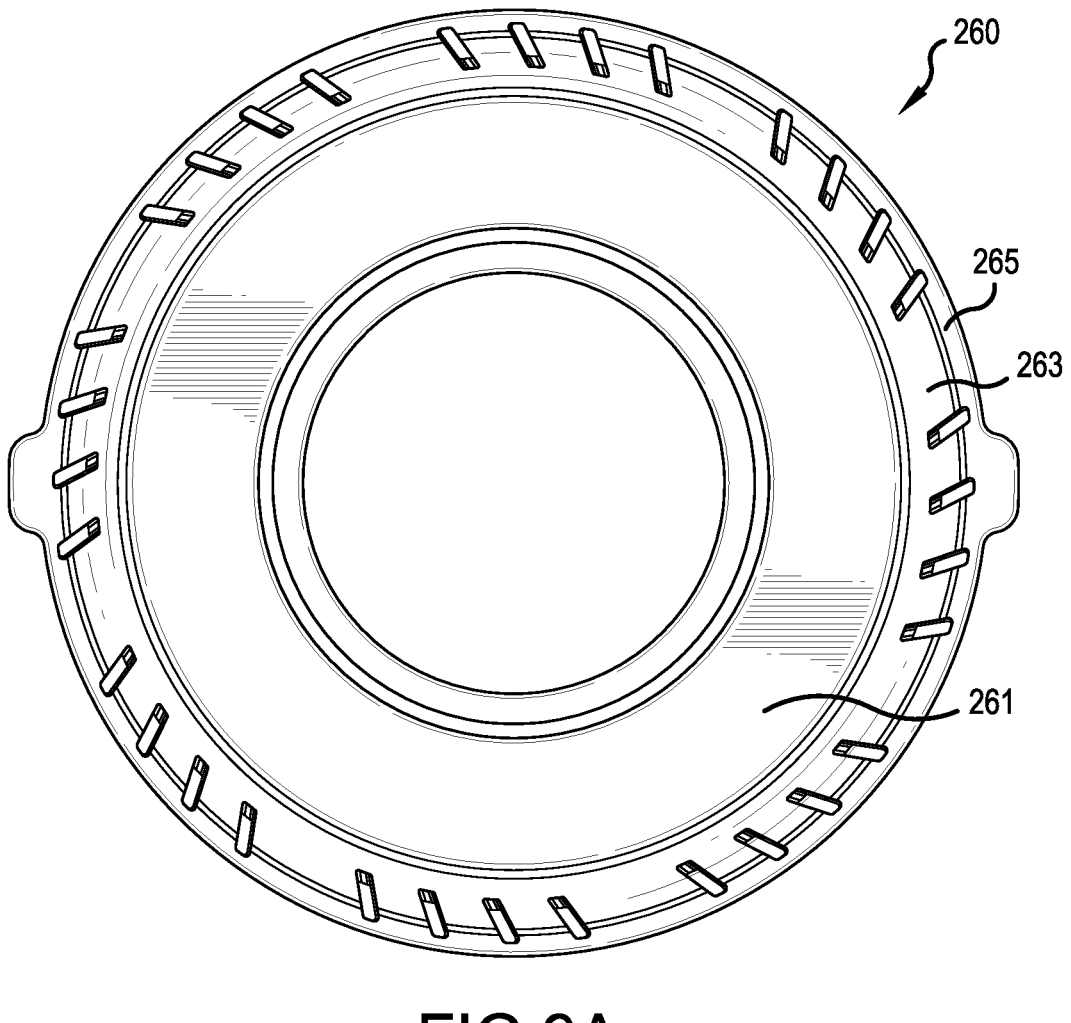
FIGS. 9A and 9B show a top and side view of a sixth stacking tray according an embodiment of the present disclosure.

Finally, as shown in FIGS. 9A and 9B, the sixth stacking tray 260 may have a similar configuration to the fifth stacking tray 250 as it also includes a bottom wall 261, a sidewall 263, and a rim or flange 265. Generally, the sidewall 263 may have a larger height than that of the fifth stacking tray 250 while the flange 265 may be smaller than that of the fifth stacking tray 250. The sixth stacking tray 260 may also include a plurality of slots 267 and one or more ribs 269 similar to the fifth stacking tray 250. In this arrangement, the slots 267 may not extend into the bottom wall 261 and may also be slightly curved as they extend in the radial direction. The one or more ribs 269 may curve as they extend away from the sidewall 263. In addition, the lengths of the ribs 269 may be greater than the length of the slots 267 in the sidewall 263. Finally, the bottom wall 261 of the sixth tray 260 may have a stepped portion to allow more versatility in which cookware the sixth tray 260 is locatable between.

In the exemplary arrangement of the stackable cookware system 100, the first to fifth stacking trays 210 to 250 have flanges of increasing outer diameter; however, they are not limited to this arrangement. In addition, while each of the bottom walls may have an opening, the inner diameter of the opening does not necessarily increase from the first to fifth stacking trays 210 to 250. The flange 265 of the sixth stacking tray 260 may have an outer diameter substantially equal to the outer diameter of the flange 255 of the fifth stacking tray 250.

While relative sizes of the first to sixth stacking trays 210 to 260 have been described, it is understood that these sizes may vary dependent on the stacking order and relative sizes of stackable cookware. In addition, the number of stacking trays may be dependent on the number of cookware and types of cookware provided.

The material for the stacking trays may be polypropylene or other suitable materials that are durable, impact resistant and heat resistant. The stacking trays may be made by injection molding or other suitable processes.

The disclosure thus being described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A stacking system comprising
   a plurality of circular stacking trays, each stacking tray configured to support a corresponding cookware, each stacking tray including:
   a bottom wall;
   a sidewall extending upward from the bottom wall;
   a flange extending radially outward from an upper portion of the sidewall; and
   a plurality of through slots extending radially away from a center of the stacking tray, each through slot extending along and through at least a portion of the sidewall and into the flange,
   wherein each stacking tray is made of plastic,
   wherein the bottom wall includes a circular opening extending therethrough, wherein each stacking tray includes one or more ribs extending outward from an outer surface of the sidewall,
   wherein the plurality of stacking trays includes a first stacking tray and a second stacking tray, and
   wherein the one or more ribs of the first stacking tray are receivable in corresponding through slots of the second stacking tray.

2. The stacking system of claim 1, wherein a length of each of the one or more ribs is greater than or less than a length of adjacent through slots in the sidewall.

3. The stacking system of claim 1, wherein the plurality of stacking trays includes at least three stacking trays, and
   wherein an outer diameter of each flange of each stacking tray increases from an uppermost tray to a lower most tray.

4. The stacking system of claim 3, the plurality of stacking trays includes five stacking trays.

5. The stacking system of claim 1, further comprising a plurality of cookware,
   wherein a total number of stacking trays is one less than a total number of cookware such that a corresponding stacking tray is locatable between adjacent pairs of cookware.

6. A stackable cookware set comprising:
   a plurality of stacking trays, each stacking tray including:
   a bottom wall;
   a sidewall extending upward from the bottom wall;
   a flange extending radially outward from an upper portion of the sidewall; and
   a plurality of through slots extending radially away from a center of the stacking tray, each through slot extending through at least a portion of the sidewall and flange; and
   a plurality of cookware,
   wherein a total number of stacking trays is one less than a total number of the cookware such that a corresponding stacking tray is locatable between adjacent pairs of cookware, and
   wherein each stacking tray is made of plastic.

7. The stackable cookware set of claim 6, where the plurality of cookware includes at least three selected from a small sauté pan, a small sauce pot, a medium sauce pot, a Dutch oven, a medium sauté pan, a deep sauté pan, and a large sauté pan.

8. The stackable cookware set of claim 6, wherein each through slot does not extend into the bottom wall.

9. The stackable cookware set of claim 6, wherein each stacking tray includes one or more ribs extending outward from an outer surface of the sidewall.

10. The stackable cookware set of claim 9, wherein a length of each of the one or more ribs is greater than or less than a length of adjacent through slots in the sidewall.

11. The stackable cookware set of claim 6, where each cookware includes at least one handle connected to a body of the cookware.

12. A stacking system comprising
   a plurality of circular stacking trays, each stacking tray configured to support a corresponding cookware, each stacking tray including:
   a bottom wall;
   a sidewall extending upward from the bottom wall;
   a flange extending radially outward from an upper portion of the sidewall; and
   a plurality of through slots extending radially away from a center of the stacking tray, each through slot extending along and through at least a portion of the sidewall and into the flange, wherein each stacking tray is made of plastic, wherein the bottom wall includes a circular opening extending therethrough, and wherein the flange extends from the sidewall in a plane parallel to the bottom wall.

13. A stacking system comprising a plurality of circular stacking trays, each stacking tray configured to support a corresponding cookware, each stacking tray including:

a bottom wall;

a sidewall extending upward from the bottom wall;

a flange extending radially outward from an upper portion of the sidewall; and a plurality of through slots extending radially away from a center of the stacking tray, each through slot extending along and through at least a portion of the sidewall and into the flange, wherein each stacking tray is made of plastic, wherein each stacking tray includes one or more ribs extending outward from an outer surface of the sidewall, wherein the plurality of stacking trays includes a first stacking tray and a second stacking tray, and wherein the one or more ribs of the first stacking tray are receivable in corresponding through slots of the second stacking tray.

\* \* \* \* \*